(No Model.)
A. E. SCHLIEDER.
KITCHEN IMPLEMENT.
No. 561,135.  Patented June 2, 1896.
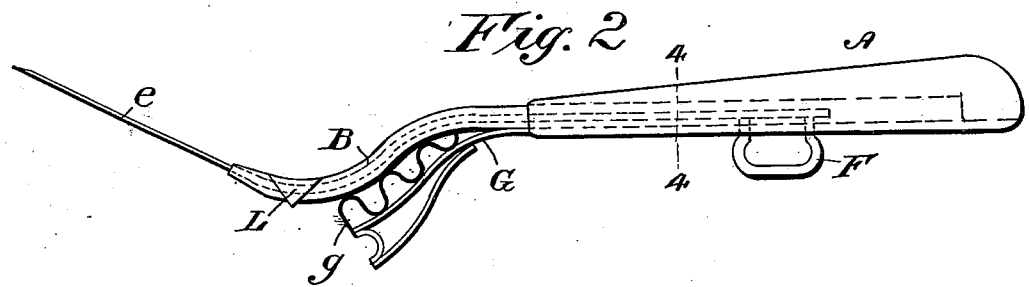
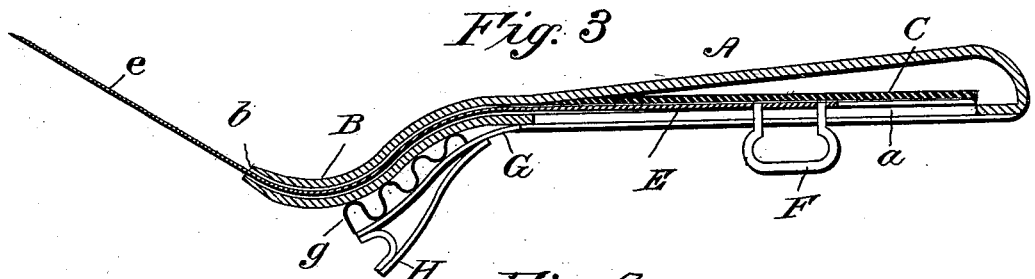
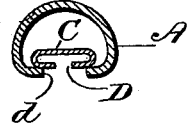
WITNESSES:
W. B. Harris
C. Gerst
INVENTOR
Augustus E. Schlieder
BY
Edgar Tate & Co
ATTORNEYS.

UNITED STATES PATENT OFFICE.

AUGUSTUS E. SCHLIEDER, OF SIOUX CITY, IOWA.

KITCHEN IMPLEMENT.

SPECIFICATION forming part of Letters Patent No. 561,135, dated June 2, 1896.

Application filed August 30, 1895. Serial No. 560,994. (No model.)

*To all whom it may concern:*

Be it known that I, AUGUSTUS E. SCHLIEDER, a citizen of the United States, and a resident of Sioux City, in the county of Woodbury and State of Iowa, have invented certain new and useful Improvements in Kitchen Implements, of which the following is a specification, reference being had to the accompanying drawings, forming a part thereof, in which similar letters of reference indicate corresponding parts.

This invention relates to kitchen implements, and the object thereof is to provide a device for removing cakes, pies, and similar articles from the pan in which they have been baked without mutilating or breaking the same; and with this and other objects in view the invention consists in the device hereinafter described and claimed.

The invention is fully disclosed in the following specification, of which the accompanying drawings form a part, in which—

Figure 1 is a plan view of my improvement; Fig. 2, a side view thereof; Fig. 3, a longitudinal vertical section, and Fig. 4 a transverse section on the line 4 4 of Fig. 2.

In the practice of my invention I provide an implement or utensil comprising a handle A, which is provided with a shank B, which is bent in the form of an ogee curve, or downwardly, outwardly, and upwardly from the handle A, as clearly shown in Fig. 2. The handle A and the shank B are hollow, and the handle is provided with a longitudinal slot *a* in the bottom thereof, and secured within the handle over said slot is a longitudinal keeper C, which is substantially elliptical in cross-section, and the lower side of which is provided with a longitudinal slot D.

Although I have described the keeper C as elliptical in cross-section, the sides thereof are practically flat, and placed therein is a sliding strip or plate E, with which is connected a yoke-shaped handle F, which extends through the slots D and *a*, and by means of which the strip or plate E is moved back and forth within the handle A. The strip or plate E is preferably formed of thin spring-steel and is carried out through the hollow curved shank B and the end thereof formed into a blade *e*, and said blade may be withdrawn within the shank B or projected therefrom, as shown in Figs. 2 and 3.

Connected with the lower inner end of the shank B is a plate-spring G, which is provided on its inner side with a convoluted plate *g*, adapted to bear upon the under surface of the shank B, and secured to the lower outer end of the spring G is a projection or handle H.

The blade *e* is preferably thin and comparatively sharp at both edges, and the outer end of the shank B, at *d*, is also formed as thin as possible, and the operation is substantially as follows: When it is desired to remove a pie or cake from the pan in which it has been baked, the blade E is withdrawn within the shank and the latter is inserted between the rim or edge of the pie and the rim or edge of the pan and the end of the shank pressed downwardly in contact with the bottom of the pan, and during this operation the outer end of the spring G is pulled backwardly, so that the rim of the pan will pass between the convoluted plate G and the inner surface of the shank B. The blade E is then projected beneath the pie or cake in the pan by operating the handle F, and the device is moved around the pan in such manner as to entirely separate the bottom and rim or edges of the pie or cake from the pan, as will be readily understood.

The outer end of the shank B is provided with a flat pointed projection L, which is connected with the lower side thereof, and which assists in the operation above described, and when the device is properly operated the pie or cake may be easily and readily removed from the pan in which it has been baked without in any way breaking or injuring the same, and it will thus be seen that I accomplish the object of my invention by means of a device which is simple in construction and operation and well adapted to accomplish the result for which it is intended.

My invention is not limited to the exact form and arrangement of the various parts thereof, and I therefore reserve the right to make all such alterations therein as fairly come within the scope of the invention.

Having fully described my invention, I claim and desire to secure by Letters Patent—

1. A device for removing pies, cakes and other articles from the pan in which they have been baked, comprising a hollow handle, having a longitudinal slot in the bottom thereof, and a hollow curved shank, said handle being provided with a longitudinal keeper, which is substantially elliptical in cross-section, and provided with a longitudinal slot in the bottom thereof, and a metal strip or plate adapted to slide in said keeper, and provided with a handle which extends through a slot therein, said metal strip or plate being formed into a blade at its outer end, which is adapted to be projected from the shank of the handle, substantially as shown and described.

2. A device for removing pies, cakes and other articles from the pan in which they have been baked, comprising a hollow handle, having a longitudinal slot in the bottom thereof, and a hollow curved shank, said handle being provided with a longitudinal keeper, which is substantially elliptical in cross-section, and provided with a longitudinal slot in the bottom thereof, and a metal strip or plate adapted to slide in said keeper, and provided with a handle which extends through a slot therein, said metal strip or plate being formed into a blade at its outer end, which is adapted to be projected from the shank of the handle, said shank being curved downwardly, outwardly and upwardly, and provided on its lower side with a spring which is adapted to grasp and hold the rim of the bake-pan in connection with the shank, substantially as shown and described.

In testimony that I claim the foregoing as my invention I have signed my name, in presence of the subscribing witnesses, this 20th day of August, 1895.

AUGUSTUS E. SCHLIEDER.

Witnesses:
J. P. BLOOD,
H. W. STONE.